United States Patent Office 3,480,759
Patented Nov. 25, 1969

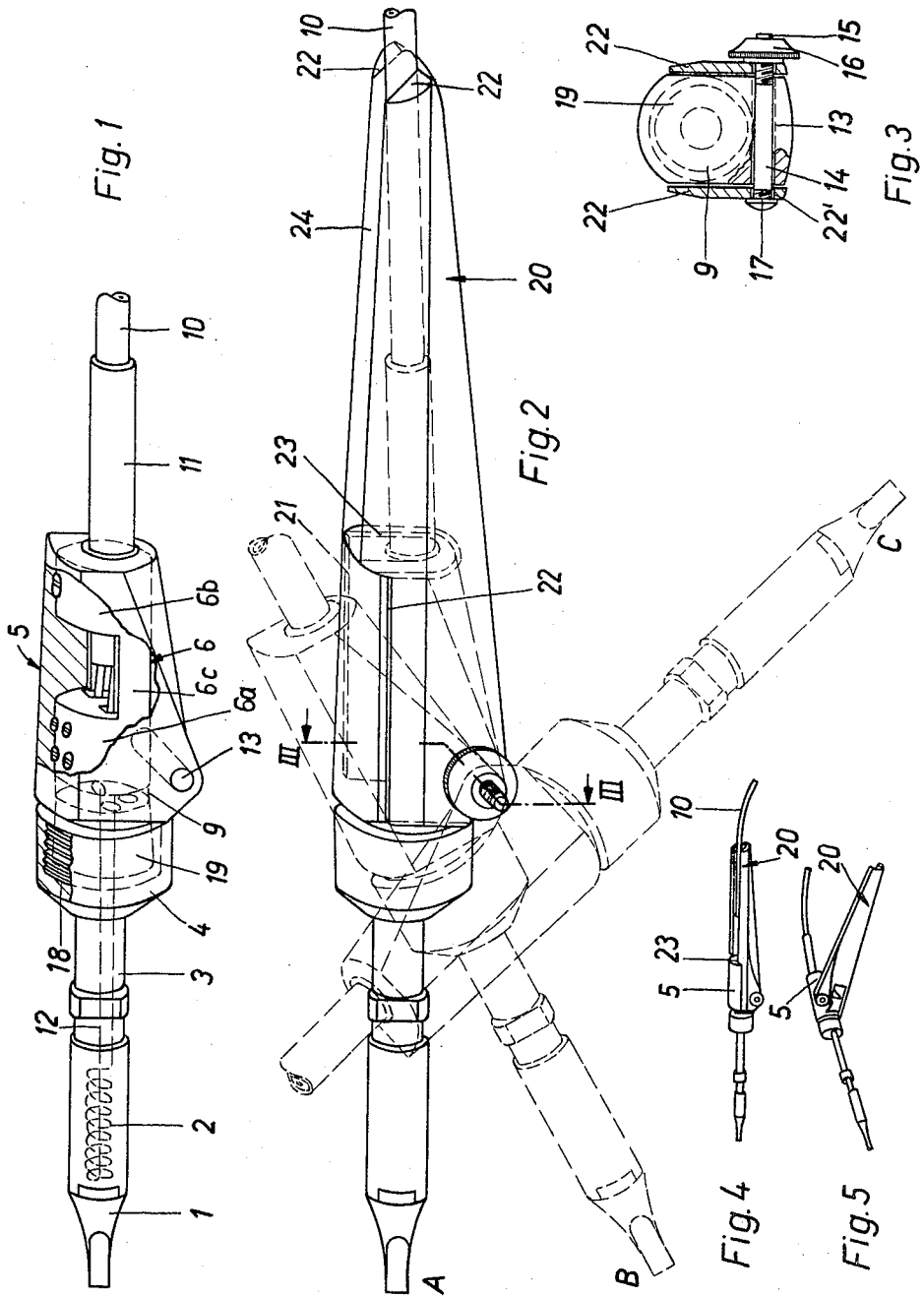

3,480,759
ELECTRICAL SOLDERING TOOL AND PIVOTAL MOUNT THEREFOR
Ernst Sachs, Wertheim (Main), and Bernhard Schwan, Baden-Baden, Germany, assignors to ERSA Ernst Sachs KG, Wertheim (Main), Germany
Filed Dec. 27, 1965, Ser. No. 516,563
Claims priority, application Germany, Jan. 13, 1965, E 28,502
Int. Cl. H05b *1/00, 3/42;* B23k *3/02*
U.S. Cl. 219—242                        5 Claims

ABSTRACT OF THE DISCLOSURE

A soldering tool and a mounting stand therefor comprise a shank tube having a soldering tip with a heating element therein. A block is secured to the tube at a spaced location from the tip and an electrical cable extends axially in a direction opposite to the tip outwardly through the end of the block. A handle member is pivoted to the block and it includes two arm portions arranged on respective opposite sides of the block which form a cradle therefor, but which do not interfere with the passage of the cable outwardly through the end of the block. The handle member, in one embodiment, is constructed to be pivotally mounted on a holder which, in turn, is mounted for pivotal movement about a vertical axis. The handle member is biased in one direction and it may be moved in an opposite direction to facilitate the positioning of the soldering tip by either a hand key or by a foot pedal connected to the handle through a cable.

---

This invention relates in general to the construction of soldering tools, and in particular to a new and useful electric soldering tool, particularly for industrial use, which is mounted in a holding tube or handle element for manipulation for use purposes.

With conventional soldering tools it is necessary, depending on the form of the handle of the tool, to hold the soldering element at a location quite removed from the soldering point. For this reason, a soldering tool is advantageously held by a support to leave the hands free. In the case of precision soldering operations, and in particular for industrial application, for example as they occur for wiring electronic circuits, the soldering tip must often be held at an unfavorable position in the hand. In addition, because the hands must be employed to hold the soldering elements, it is not always possible to hold the workpiece or the work support and to steady it during the soldering. All of these disadvantages may result in poor soldering quality.

In accordance with the invention, the disadvantages of the prior art are overcome by the provision of a soldering tool which includes a support or handle element which makes it simple to position the soldering tool in a desired work-oriented location. To facilitate such an arrangement, the soldering tool is not provided with a handle on an extension of the shank tube of the soldering element, but rather is provided with a cradle or holding construction which facilitates the simple maneuvering of the soldering tool tip. For this purpose, a block element is advantageously formed on the shank tube of the soldering tool and it is provided with a joint which permits the tool to be hingedly supported within a receiving cradle or supporting element. The construction is such that the tip of the soldering element may be maneuvered through substantially 360° in order to orient it at a proper location in respect to the workpiece in accordance with the soldering requirements therefor. The construction is such that the soldering tool tip may be adjusted to a desired position and clamped in the adjusted position in a simple and easy manner. This makes it possible to solder fine soldering points more steadily than heretofore and to use the soldering tool in universal manner in almost every working position. With it, extremely precise and sensitive soldering operations can be carried out because the soldering tip can usually be applied more favorably and always more steadily than with prior art constructions. The supporting element for the soldering tool may comprise a cradle-type handle or a mounting formation which permits the pivotal movement of the soldering tool under the control of a positioning handle. In the latter arrangement, the tool is advantageously also mounted for vertical and rotational adjustment so that precise positioning of the soldering tip may be easily accomplished.

Accordingly, it is an object of the invention to provide a soldering tool construction including means for pivotally supporting the tool so that the tip may be adjusted to a selected position for soldering.

A further object of the invention is to provide a soldering tool construction, including means for supporting the soldering tip so that it may be oriented in any desired location, such means advantageously including a cradle-type handle or a universal mounting for the tool permitting it to be swung through any arc and rotated about a vertical plane.

A further object of the invention is to provide a soldering tool construction which is simple in design, rugged in construction and economical to manufacture.

The various features of novelty which characterize the invention are pointed out with particularity in the claims annexed to and forming a part of this speiification. For a better understanding of the invention, its operating advantages and specific objects attained by its use, reference should be had to the accompanying drawings in which there are illustrated and described preferred embodiments of the invention.

In the drawings:

FIG. 1 is a side perspective view of a soldering tool for industrial use constructed in accordance with the invention;

FIG. 2 is a view similar to FIG. 1, but showing the supporting handle cradle construction and some of the pivotal movement positions of the soldering tip;

FIG. 3 is a section taken on the line III—III of FIG. 2;

FIG. 4 is a perspective view of the soldering tool with the handle cradle, on a reduced scale;

FIG. 5 is a view similar to FIG. 4, showing the soldering tool in a position pivoted from that indicated in FIG. 4;

Figures 6, 7:
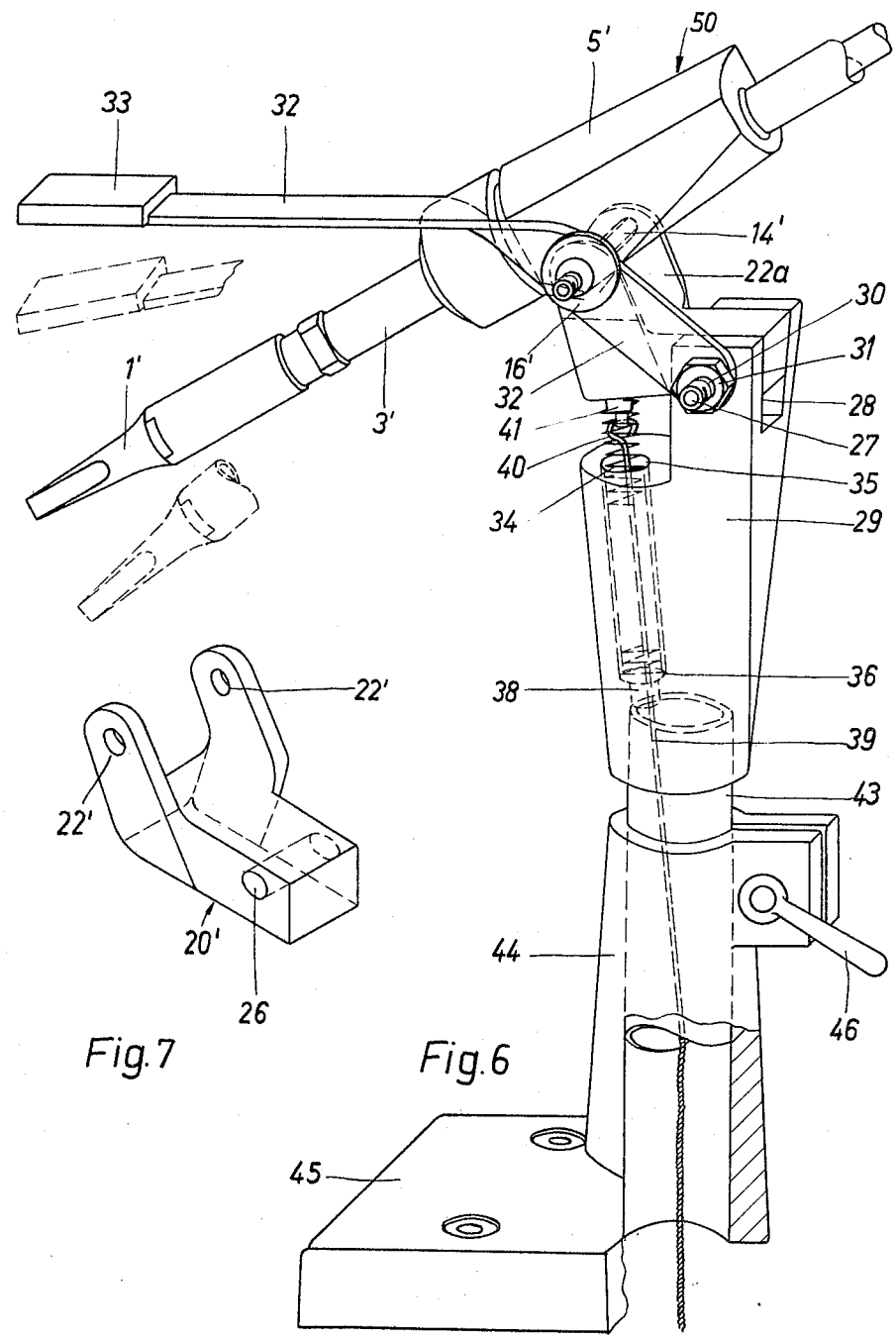
FIG. 6 is a perspective view of a soldering tool on a universal stationary mount.
FIG. 7 is a perspective view of a portion of the mount indicated in FIG. 6.

Referring to the drawings in particular, the invention embodied therein in FIGS. 1 to 5 comprises an industrial soldering tool which is capable of universal adaptation in industrial fields for soldering. The soldering tool comprises the usual soldering tip 1 with a heating element 2 which is represented diagrammatically by a heating element electrical winding. The tip 1 is carried at the end of a shank tube 3 which, in turn, is fastened by means of a cap nut to a block or pivotal block element 5. The block 5 has an interior terminal element generally designated 6 which includes a terminal strip 6a, a clamping ring 6b, and an intermediate portion 6c (FIG. 1). The terminal element 6 is located within a cylindrical cavity 9 of the block 5.

The assembly of the block 5 with the remaining portion of the soldering tool occurs by removing the cap nut 4. A cable 10 and a pinch protection sleeve 11 are relieved from traction by means of the clamping body portion 8 which is located centrally within the block 5. This clamping connection also establishes electrical connection with the two lead wires 12 of the heating element 2.

In accordance with the invention, the block 5 is provided with a transverse bore 13 on one side for receiving an axle member 14 which includes means associated therewith for clamping the block 5 with the rest of the soldering tool in an adjusted operating position. As indicated in FIG. 3, the terminal screw is provided on one end with a threaded portion 15 for threaded engagement with a clamping terminal nut 16. The opposite side of the axle 14 is provided with a headed portion 17 to prevent withdrawal through the bore 13.

In order to effect clamping of the shank tube 3 in the internal bore of the threaded shoulder 18, there is provided the usual conical clamping piece 19.

In accordance with the embodiment of the invention indicated in FIGS. 2 to 5, the soldering tool which includes the soldering tip 1, the shank portion 3, the cap nut 4, and the block 5 with the protective sleeve 11 and cable 10, is mounted in a supporting cradle or handle member generally designated 20. For this purpose, the cradle 20 is provided with arm portions 22, 22 which have cross bores 22' adjacent one end which align with the bore 13 and which are adapted to receive the axle 14 for the pivotal support of the soldering tool. In the solid line position A, indicated in FIG. 2, and in the position indicated in FIG. 4, the soldering tool is shown within the U-shaped cradle or handle member 20. The tool may be used in this manner or may be rotated to the position indicated B or C, for example. A solid line perspective view of the location of the tool in the position B in respect to the handle 20 is indicated in FIG. 5. The side walls 22, 22 of the handle 20 are joined along a major portion of the length of the handle and form a substantially U-shaped receiving groove 24 for accommodating the rear portion of the tool in the solid line position indicated A in FIG. 2 and also shown in FIG. 4. The inner end of the block 5 is located directly adjacent the interior wall 23 of the handle 20 in the position indicated in FIG. 4. In each position of the tool, the tool may be clamped so that it will not rotate out of the position by tightening the clamping nut 16. It should be noted that in the position indicated in dotted lines at C, the end of the soldering tool may be used where the distance from the soldering tip to the holding handle 20 is very small.

In the embodiment indicated in FIG. 6, a soldering tool generally designated 50, with a block 5' similar to the block of the other embodiment, is mounted in a handle element generally designated 20' for pivotal movement on a supporting axle 14'. The handle element 20' includes arms 22', 22' similar to the handle element 20 of the other embodiment. In this construction, however, the handle element 20' includes a bore 26 for receiving a bolt 30 which also extends through arms 28 of a mounting bracket or holder generally designated 29. The mounting 29 includes a tubular bottom portion which fits over an adjustable tubular extension 43 of a mounting stand in a manner such that the bracket 29 may be pivoted about a vertical axis. The tubular element or column 43 is clamped in an adjusted elevation in a clamping member 44 which is held on a foot or base 45. A clamping handle 46 is provided for clamping the tubular element 43 in a vertically adjusted position.

The holding bracket 29 includes a bore 35 in which is positioned a compression spring 34 which resiliently biases upwardly the lower end of the handle member 20'. A cable line 39 extends upwardly through the tubular element 44 and connects to an eyelet-formation 40 defined on an extension 41 on the lower portion of the handle member 20'. The cable 39 is advantageously connected at its lower end (not shown) to a foot pedal (not shown) for the manipulation of the tool by one's foot.

A hand lever or key 32 includes a straight portion with bores which extend over the axles 14 and 27 and an angle portion which extends outwardly in a horizontal plane and terminates in a handle engagement element or key plate 33. A clamping terminal nut 16' may be tightened to anchor the tool in relation to the handle element 20'. When this is done, then the handle 32 may be depressed as indicated in dotted lines to change the orientation of the tip 1' of the soldering tool. A nut 31 is threaded over the end of the bolt 30.

The soldering tool thus may be oriented either by actuating the key 32 or by loosening the nut 16' to permit separate rotational movement of the tool in respect to the supporting handle 20'. When the mounting stand is employed, the soldering tool may be pivoted about both horizontal and vertical axes and also may be adjusted as to elevation.

What is claimed is:

1. An electrical soldering tool comprising a shank tube with a soldering tip and a heating element, a block secured to said shank tube, an electrical cable for the heating element current supply connected to said block, a handle member for pivotally supporting said block for selectively positioning the soldering tip in respect to a workpiece, a bracket pivotally supporting said handle member for rotation about a horizontal axis, means for supporting said bracket for pivotal movement about a substantially vertical axis, spring means on said bracket biasing said handle member upwardly, and a hand-engaging key connected to said handle member for moving said handle member downwardly against said upward biasing action of said spring for positioning said soldering tip.

2. An electrical soldering tool according to claim 1, including a connecting cable connected to said handle member for urging said handle member downwardly against the action of said spring for positioning the end of said soldering tip.

3. An electrical soldering tool comprising a shank tube with a soldering tip and a heating element, a block secured to said shank tube, an electrical cable for the heating element current supply connected to said block, a mounting base, a tube adjustably positionable in respect to elevation within said mounting base, a bracket pivotally mounted over said tube for rotation about a vertical axis, a handle member pivotally carried at the upper end of said bracket and being pivotally connected to said block member, means for clamping said block member in a pivotally adjusted position in respect to said handle member, means biasing said handle member upwardly, a foot pedal cable member connected to said handle member for pulling said handle member downwardly, and a key member connected to said handle member for moving said handle member with said block for positioning the tip of said soldering tool.

4. An electrical soldering tool comprising a shank tube with a soldering tip and a heating element, a block secured to said shank tube, an electrical cable for the heating element current supply connected to said block, a handle member for pivotally supporting said block for selectively positioning the soldering tip in respect to a workpiece, a bracket pivotally supporting said handle member for rotation about a substantially horizontal axis, means for supporting said bracket for pivotal movement about a substantially vertical axis, means biasing said handle member upwardly, and control means connected to said handle member for moving said handle member against said biasing for positioning said soldering tip.

5. An electric soldering tool comprising a soldering tip including an electrical heating element; a shank tube secured at one end to the inner end of said tip; a block secured at one end to the other end of said shank tube; a supply cable for said heating element connected to the latter and extending through said shank tube and said block, said cable extending out of the opposite end of said block with the remainder of its length free of connection to said soldering tool; said block having a transverse bore therethrough laterally of said cable, and constituting one member of a two part hinge connection; a relatively elongated, generally channel-shaped handle for said soldering tool, said handle including an inner portion having a pair of apertured walls laterally spaced to closely embrace said block, and pivotally connected to said block by hinge pintle means extending through the apertures in said walls and through said bore, said handle having an outer upwardly opening channel portion dimensioned to receive and closely embrace at least a part of the remaining length of said cable when said handle is moved upwardly to a position in which it is aligned longitudinally with said block and having a shoulder at the junction of said inner and outer portions engageable with said block to limit such upward movement to said longitudinally aligned position; and clamping means operatively associated with said hinge pintle means to clamp said block and said handle in angularly adjusted position.

References Cited

UNITED STATES PATENTS

| | | | |
|---|---|---|---|
| 1,928,522 | 9/1933 | Amundsen | 228—55 |
| 2,219,649 | 10/1940 | Hayes et al. | 219—238 X |
| 2,391,065 | 12/1945 | McKinley | 219—230 |
| 2,438,525 | 3/1948 | Walters | 219—230 X |
| 2,459,371 | 1/1949 | Foster | 219—230 X |
| 1,519,246 | 12/1924 | Forshee et al. | 219—230 |

FOREIGN PATENTS

| | | |
|---|---|---|
| 125,022 | 6/1944 | Australia. |
| 924,162 | 3/1947 | France. |
| 812,095 | 8/1951 | Germany. |
| 556,609 | 10/1943 | Great Britain. |
| 534,966 | 10/1955 | Italy. |

ANTHONY BARTIS, Primary Examiner

U.S. Cl. X.R.

219—229, 230; 228—55